Nov. 20, 1923.
O. B. DEPUE
1,474,409
MOTION PICTURE FILM PRINTING APPARATUS
Filed May 14, 1921    3 Sheets-Sheet 1
Fig. 1
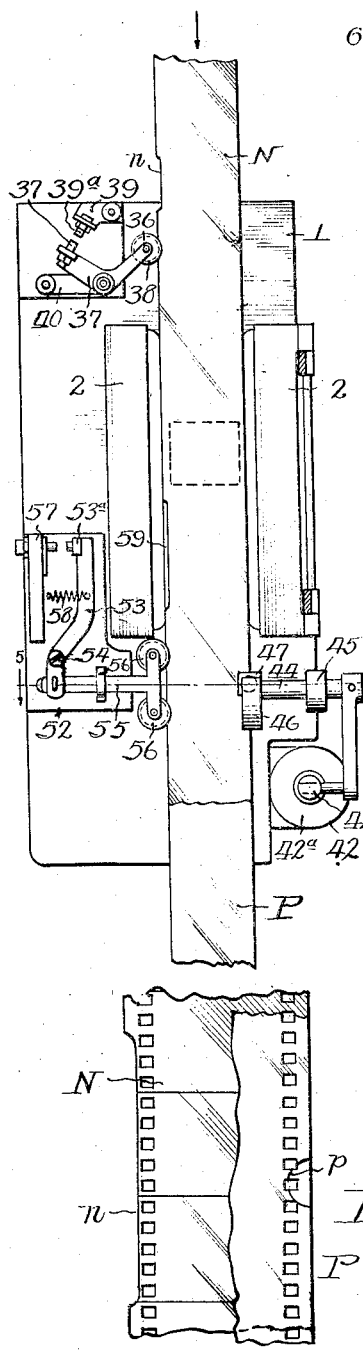
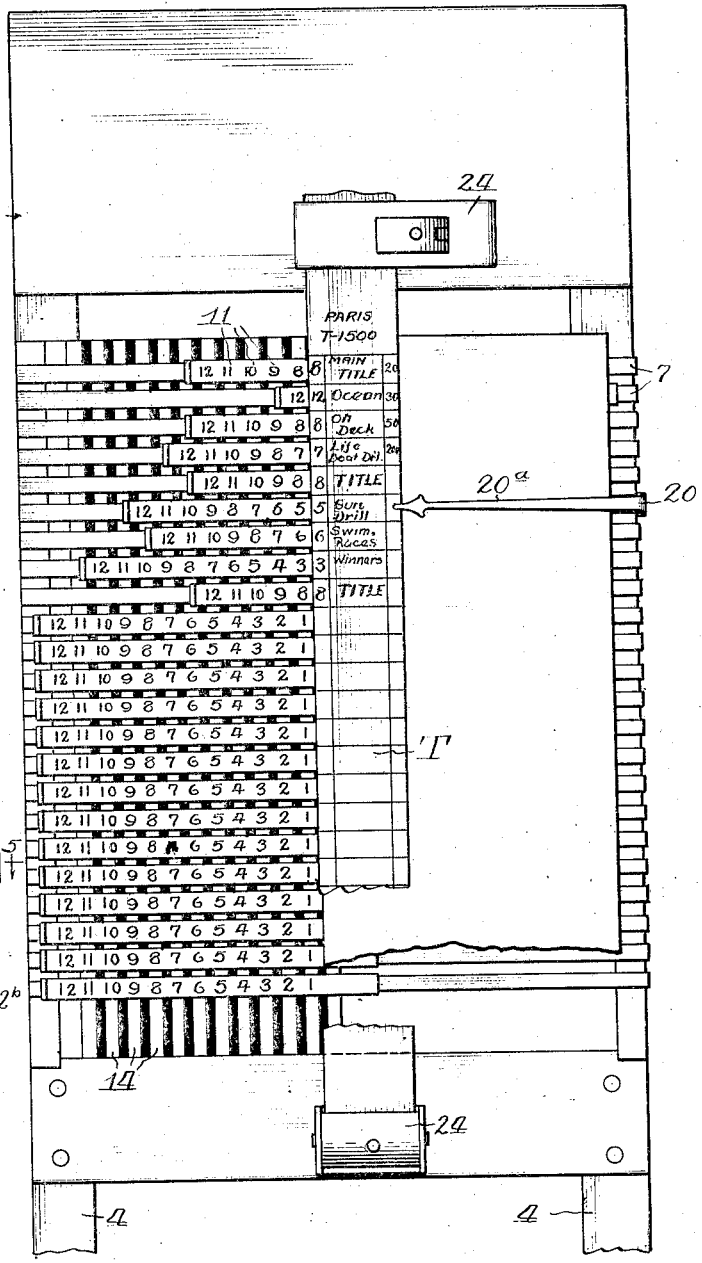
Fig. 6
Inventor,
Oscar B. Depue,
By Offield, Poole & Towle
Attys.

Nov. 20, 1923.
O. B. DEPUE
1,474,409
MOTION PICTURE FILM PRINTING APPARATUS
Filed May 14, 1921        3 Sheets-Sheet 2
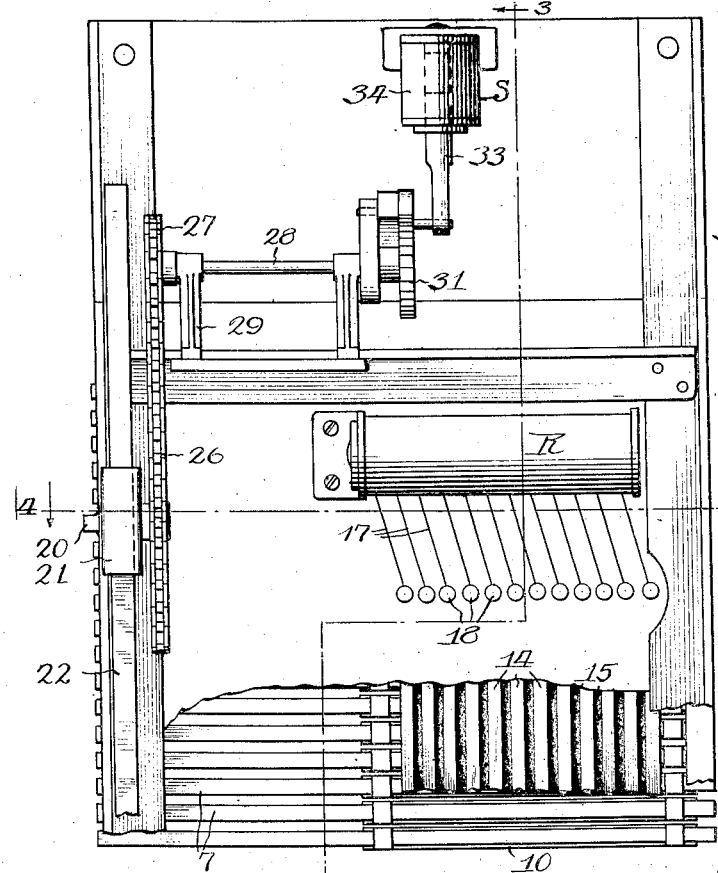
Fig. 2
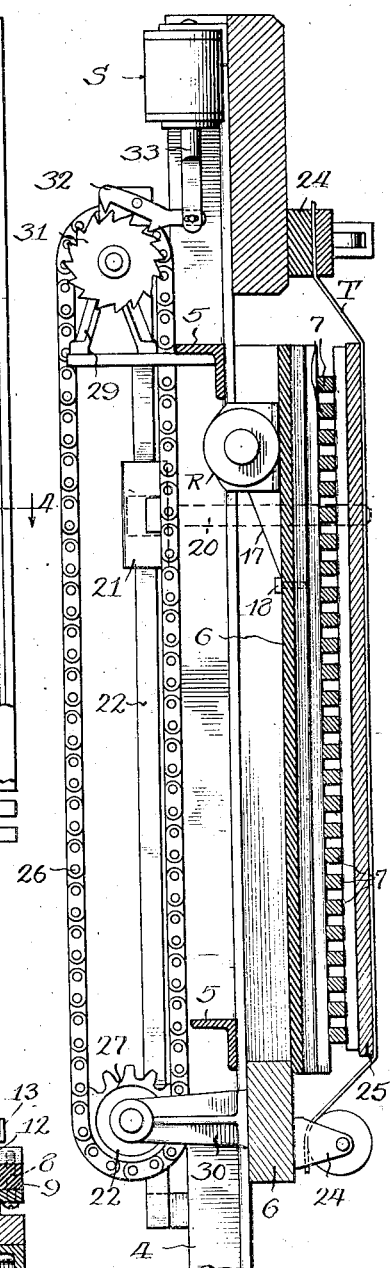
Fig. 3
Fig. 4
Inventor
Oscar B. Depue,
By Offield, Poole & Shuton
Attys.

Nov. 20, 1923.
O. B. DEPUE
1,474,409
MOTION PICTURE FILM PRINTING APPARATUS
Filed May 14, 1921   3 Sheets-Sheet 3
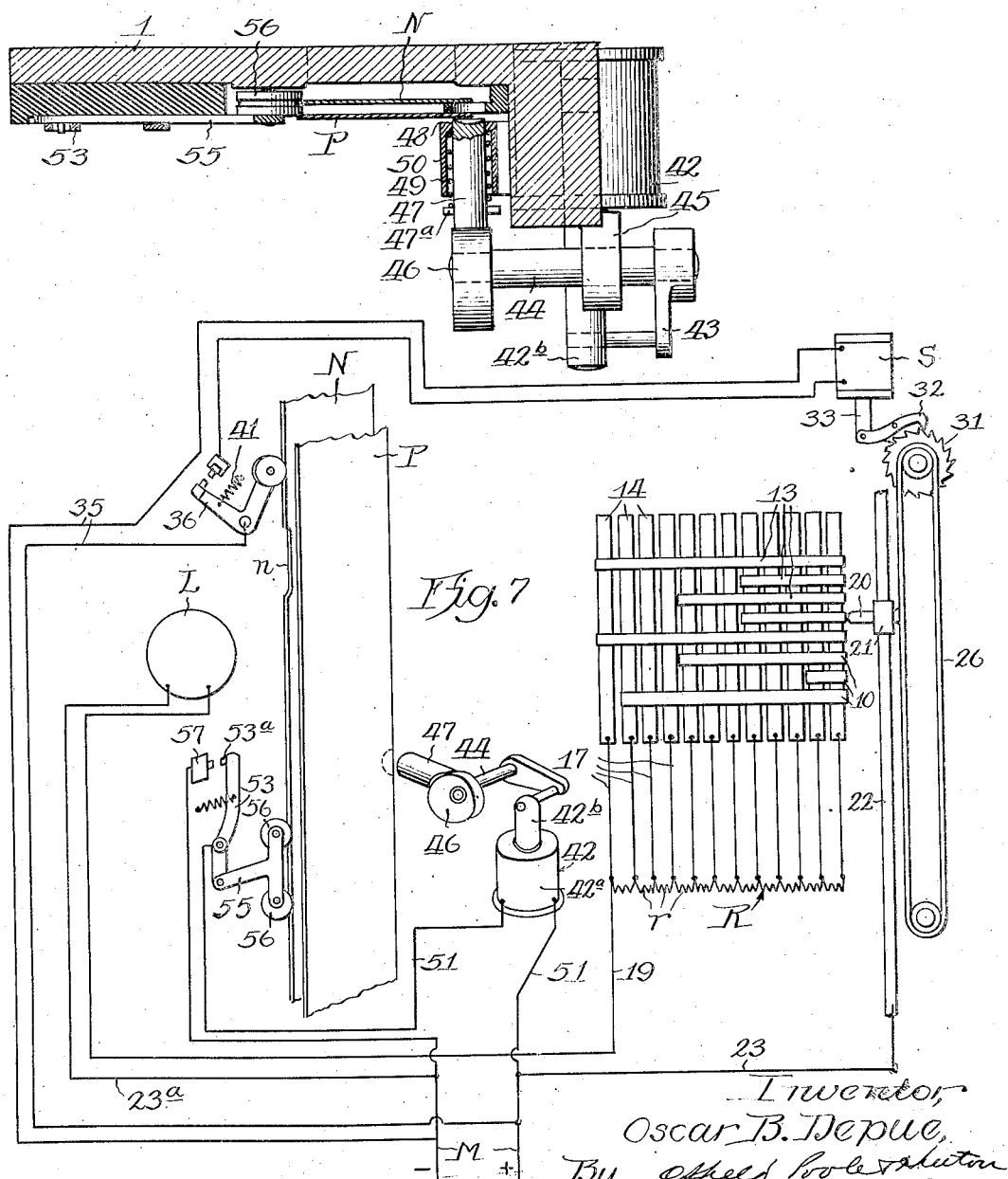

Patented Nov. 20, 1923.

1,474,409

UNITED STATES PATENT OFFICE.

OSCAR B. DEPUE, OF CHICAGO, ILLINOIS.

MOTION-PICTURE FILM-PRINTING APPARATUS.

Application filed May 14, 1921. Serial No. 469,418.

*To all whom it may concern:*

Be it known that I, OSCAR B. DEPUE, a citizen of the United States, and a resident of Chicago, in the county of Cook and State of Illinois, have invented certain new and useful Improvements in Motion-Picture Film-Printing Apparatus, of which the following is a specification.

This invention relates to improvements in motion picture film printing apparatus, and more particularly to a device used in connection with the printing apparatus for automatically controlling the intensity of light used in the printing operation as determined by the nature of the pictures to be printed.

In the art of printing motion picture films a process not unlike that used in printing from ordinary photographic negatives is employed, although somewhat more complicated by reason of the character of the negative film, which is well known to consist of a strip of celluloid-like substance of great length on which are negatively produced a multitude of small pictures. The process of transferring the pictures from a negative to a positive film is accomplished by passing a negative film and a positive film in superimposed relation in front of an aperture through which light rays from a source of light, such as an incandescent lamp, are allowed to strike the negative film, thus reproducing the pictures successively upon the sensitized surface of the positive film. The negative film may be of any desired length, for example, one thousand feet in length, in which case it would ordinarily be termed a "reel."

In the process of printing from a negative film, it is fed from one reel through the printing apparatus, and rewound on another reel, the length of the film being only limited by the size of the reel that can be conveniently handled. In the case of the positive film, however, the length of film which can be fed to the printing machine is limited to a length which can be conveniently handled in the developing machine, it being understood that a positive film must be developed after it is printed. Up to the present time a positive film of not over two hundred feet in length could be successfully developed, so that although a positive film might be continuously fed to the printing machine and of the same length as the negative film, it must be subsequently cut into shorter lengths in order to be developed.

It is also well known that a single negative film may contain different scenes taken at different places and under different conditions of light, with the result that a greater intensity of light is required to print certain portions of the film than is required by others. The intensity of light required for printing various degrees of films have been well established in practice so that it devolves upon the operator of a printing machine to change the intensity of the light to correspond to the particular scenes that are being printed. For instance, it is well established that the title picture requires a certain intensity of light in order to produce a sharp and clear reproduction on the positive film so that during the printing of the title a certain light intensity, which may be represented by the figure "8," is used. Immediately following the title, a scene taken on the ocean is to be printed, in which case a light intensity, represented by the figure "12" would be required. For this purpose devices are used for automatically changing the intensity of the light by varying the amount of resistance in the lamp circuit. Having previously charted the film with respect to the successive light intensities required during the printing operation, various methods are employed for automatically changing the intensity as the successive scenes are printed.

It is to a device of this character that the present invention relates, the novel features thereof being hereinafter described in detail and in connection with the accompanying drawings, in which Fig. 1 is a view in front elevation of the essential part of a printing apparatus and the light intensity controlling device used in conjunction therewith, Fig. 2 is a view in rear elevation of the light intensity controlling device showing the operating parts thereof.

Fig. 3 is a view in vertical section of the light controlling device, as taken on line 3, 3 of Fig. 2, Fig. 4 is a view in horizontal section of the same, taken on line 4, 4 of Fig. 2, Fig. 5 is a view in horizontal section, taken through a portion of the printing apparatus on line 5, 5, Fig. 1, Fig. 6 is a fragmentary view in front elevation of portions of the negative film and positive film, showing the method employed for indicating the points in the positive film where the same is to be severed, and Fig. 7 is a view showing the operative parts of the complete apparatus and the electrical connections therebetween shown diagrammatically.

A preferable construction of an apparatus embodying the features of the invention combines the printing apparatus and the light intensity controlling apparatus in a single unit, although if desired, the two parts of the complete apparatus may be entirely independent of one another and only connected electrically. The printing apparatus is disclosed only in part, the portions which co-operate with the light controlling device being only illustrated, namely, a vertical plate 1 forming the front wall of a cabinet or housing within which is enclosed a source of light, such as an incandescent lamp L. The plate 1 is provided with a vertical film guide formed between two guide plates 2, 2, serving to guide a negative film N and a superimposed positive film P in a downward direction parallel to the plate 1 and in front of a rectangular aperture 3 corresponding in shape and size to the individual pictures on the negative. In a complete apparatus, a hinged door is usually mounted at one side of the groove and covers the film throughout the portion immediately adjacent the aperture 3. From the disclosure, it will be seen that if the negative and positive films are fed continuously in front of the aperture, the light rays from the lamp L will print a photographic impression upon the positive film in accordance with the well known photographic process.

A vertical frame, consisting of uprights 4 and cross members 5, (these members being preferably angle bars joined together) forms a support, not only for the printing apparatus already partially described, but also for the light controlling device now to be described in detail. The frame supports at its upper end a panel board 6 of insulating material and resembling somewhat the panel of an electrical switchboard. Mounted upon the panel and extending throughout the entire length thereof is a plurality of horizontal bars 7, clearly shown in Figs. 3 and 4 as square in cross-sectional area and secured at their ends to the vertical edges of the panel board 6 by means of screws 8 and intermediate spacing blocks 9. Slidably mounted on each of these bars is a metal strip 10 of a length substantially one-half that of the associated bar 7, each strip lying flatwise against the outer face of its supporting bar 7 and having stamped thereon a series of numbers 11, say from 1 to 12, arranged from right to left, that is, from the inner end of the strip to the outer end. These strips 10 are mounted upon the bars by means of sleeves 12 secured at the ends of each strip and surrounding said bars. The outer end of each strip is preferably bent outwardly to form a handle 13 which may be used in sliding the strips inwardly and outwardly along the bar. Immediately behind the bars 7 and mounted upon the panel board 6 is a plurality of contact bars 14 extending vertically and at right angles to the horizontal bars 7. These bars 14 extend lengthwise throughout the height of the board 6 and are insulated from each other by intermediate strips of insulating material 15 which project slightly beyond the surface of the contact bars and slightly rounded, as clearly shown in Fig. 4. The conductor bars 14 are grouped closely together and correspond in number to the numerical designations 11 appearing on the sliding strips 10. In other words, for each designation on the sliding strip there is a corresponding contact bar 14. Mounted at the outer end of each sliding strip 10 and directly connected to the sleeve 12 at said outer end is a contact member or wiper 16 adapted in the movement of each sliding strip 10 along the bar to successively engage the contact bars 14. Mounted on the back of the panel board 6 is a rheostat R, the same being a well known electrical device which is inserted in an electrical circuit for the purpose of introducing different degrees of resistance into said circuit thereby varying the amount of current delivered from the source of electrical energy to the point of consumption. In this instance the rheostat R, as clearly shown diagrammatically in Fig. 7, consists of a series of resistance units $r$ connected in series with each other and each unit connected with a contact bar 14 by a series of conductors 17 at terminals 18, as shown in Fig. 2. One terminal of the rheostat R is connected by means of a conductor 19 with the lamp L so that the current delivered to one of the conductor bars 7 passes through the contact bar 14 with which it contacts and thence through the resistance units $r$ in series with that bar. Thus it will be seen that the contact bars 14 are selective, that is, any one of the horizontal conductor bars 7 may have electrical connection with any one of the contact bars, depending on the position of the contact wiper 16 associated with such bar. To complete the lamp circuit through any one of the conductor bars 7, a movable or progressive contact member 20 is employed, the same having the form of a metallic strip adapted to travel in a vertical path in contact with the exposed ends of said conductor bars 7 (at the right in Fig. 1). This contact member or wiper 20 is fixed to a rectangular shaped block 21 slidable upon a vertical rod 22 fixed to the supporting frame behind the panel board 6. The contact member 20 is also shown diagrammatically in Fig. 7, as well as the rod 22 which has electrical connection at its lower end with a conductor 23 connected with the main circuit M of the apparatus on the positive side. The lamp circuit is completed by another conductor 23ª extending from the lamp L and connected on the negative side of the main circuit.

It is now manifest that the current may be supplied to the lamp L through a circuit comprising the particular conductor bars 7 having contact with the contact member 20, and the selected contact bar 14 determined by the position of the sliding strip 10 of the conductor bar in circuit. Inasmuch as each conductor bar 14 varies in its capacity to carry current, by reason of varying amounts of resistance in series therewith, the current capacity of each contact bar may be indicated by the position of the numbers on the sliding strips 10, such numbers also indicating the degree of intensity of light emanating from the lamp L. In this manner an intensity of light that will be obtained when the contact member 20 contacts with the several horizontal bars 7 is determined by the position of each sliding strip 10 with relation to a predetermined vertical or "zero" line with which the several numbers on said sliding strips will register. Thus by moving the strips 10 along the bars 7 until the desired number registers with such a line, the intensity of the lamp when lighted will correspond in degree to that particular numerical designation. This line may be considered as the edge of a strip of paper T, termed a tabulating strip, which is prepared prior to the printing operation in a manner hereinafter to be disclosed, and secured in a vertical position midway between the side edges of the panel over the bars 7, there being provided clamps 24, 24 above and below the panel into which the ends of the strip may be inserted and gripped. As a preferable construction, a portion of the panel is covered by a sheet of insulating material 25, which covers the right hand ends of the bars 7 and serves to space the strip T away from the bars.

As before suggested, the strip T is prepared at the time the negative film is being made up for the printing operation. As is clearly shown in Fig. 1, the surface of the strip T is divided into three vertical columns which in turn are sub-divided to form a series of divisions having a width substantially equal to that of a bar 7, each division containing three spaces, the one at the left having a numeral thereon indicating the degree of light intensity required, the central space having the subject matter of the film written thereon, and the right-hand space having a number written thereon indicating the number of feet of film occupied by the subject matter and to be printed at the light intensity indicated in the left-hand space. The entire film is charted in this manner, each change of scene having its subject matter, light intensity, and length entered in a corresponding division on the tabulating strip. Immediately prior to the printing process the strip is applied to the light regulating device preferably with its left-hand edge registering with the corresponding edge of the sheet of material 25 which thus may serve as a guide for positioning the strip T. As a means for observing at a glance the position of the contact member 20, with respect to the tabulating strip T, a pointer 20ª is provided as an extension of said member 20, the same pointing to the particular division on the strip corresponding to the bar 7, through which the current is passing.

The parts of the light intensity apparatus thus far described provide for setting the successive conductor bars by moving the sliding contact strips 10 so that the numbers on the latter register with the required light intensity entered on the strip T. Now, if the contact member 20 be placed in contact with the uppermost contact bar 7, and suitable mechanism provided for releasing the same at the instant of each scene change, permitting it to drop into contact with the next bar below, it is obvious that instantaneous changes of light intensity will be effected throughout the entire length of the film. Such mechanism will now be described.

It may be said generally that the movement of the contact member is in a downward direction contacting with each bar 7 as it progresses, the movement being by gravity, so that the mechanism employed is one which preferably releases the block 21 carrying the contact member 20, permitting the same to drop from one position to the next. The foundation of this mechanism is an electrically controlled pawl and ratchet, including associated parts as follows: Mounted on the rear side of the panel and extending parallel to the rod 22 is an endless sprocket chain 26 carried on sprocket wheels 27, 27, the upper wheel being mounted upon a shaft 28 journalled in a bracket 29 and the lower sprocket wheel journalled in a bracket 30. To the inner lead of the sprocket chain 26 the sliding block 22 is fixed. A ratchet wheel 31 is also fixed to the shaft 28 journalled in the upper bracket 29 and pivotally mounted upon an arm 29ª thereof is a pawl 32 which in turn is connected at the lower end of the armature 33 of a solenoid S mounted at the rear of the supporting frame above the pawl and ratchet. The solenoid S comprises in addition to the armature 33 a coil 34 adapted to be energized by an electric current, thus creating electro-magnetism which acts on the armature 33 to draw it upwardly into the coil 34. The upward movement of the armature 33 acts to release the pawl 32 permitting the ratchet wheel 31 to advance the angular distance between two teeth of the ratchet wheel and in a clockwise direction under the weight exerted upon the sprocket chain by the block 21 carrying the contact member 20. The spacing of the teeth of the ratchet wheel is such that the releasing of each tooth by the pawl permits the contact member to drop downwardly out of contact with a horizontal bar 7 and into contact with the one immediately below. Thus it will be seen that if the solenoid is energized momentarily at the instant each light change is required, the result will be a progressive advancement of the contact member 20 in a downward direction, contacting with successive conductor bars 7.

The energizing of the solenoid S is controlled by means of a switch incorporated in the printing apparatus and forming one element of a normally open electric circuit including the solenoid S, this circuit being clearly shown in Fig. 7 as consisting of two conductors 35, 35 connected with the positive and negative sides of the main circuit M and with the corresponding terminals of the solenoid. In this circuit is the switch 36, just mentioned, the same being located immediately adjacent the vertical path of the negative film N and above the guide members 2, 2 of the printing apparatus.

The switch 36 comprises a bell crank lever 37 provided at the end of one lever arm with a grooved roller 38 adapted to engage the adjacent margin of the negative film N. At the end of the other lever arm is provided a contact point 37ª normally spaced away from a coacting contact point 39ª forming part of a fixed terminal plate 39, said plate together with a plate 40 on which the bell crank lever 37 is mounted being connected in series with one of the conductors 35 of the solenoid circuit. Connected with the bell crank lever is a small coil spring 41 (Fig. 7) which acts to yieldingly hold the roller 38 in contact with the edge of the film N. So long as the edge of the film is perfectly straight the bell crank lever 37 remains in a position such that the contact points are spaced apart and the circuit remains open. Now, if a notch, such as $n$ is cut in any suitable manner in the edge of the film N, as shown in Fig. 1, it is apparent that when the roller engages the depression formed by said notch, the bell crank lever 37, under the tension exerted by the spring 41, will be moved so that the contact points 37ª, 39ª engage each other, thus closing the solenoid circuit for an instant, thereby energizing the solenoid, releasing the pawl and permitting the contact member 20 to drop downwardly into contact with the next conductor bar 7 of the light intensity controlling apparatus. The notches $n$ are cut in the negative film at the point where the changes of scene occur, the notching being done prior to the printing operation and in conjunction with the preparation of the tabulating strip T. Thus it will be seen that in the operation of printing from a negative film the complete film is previously charted on the tabulating strip by entering thereon the degree of light intensity required for each scene as well as the number of feet of film to be printed at each degree of light intensity. At the same time the notches $n$ are cut in the film, as before described, so that as the negative film passes through the printing machine and in contact with the roller 38 of the solenoid switch, the light intensity is automatically changed as each successive notch engages said roller 38.

As has been previously pointed out, it is necessary in printing a positive film to cut the same into lengths of approximately two hundred feet for convenience in development. As a means for marking the positive film at the points where it is to be severed a somewhat similar device is used for the purpose. This device is clearly shown in Figs. 1 and 5, and diagrammatically in Fig. 7. Mounted upon the plate 1 of the printing apparatus and below the guide members 2, 2 thereof, is another solenoid 42 consisting of a coil 42ª and armature 42ᵇ, said solenoid being so mounted that the armature is moved horizontally and at right angles to the plane of the film. Connected with the armature is a crank 42 mounted at the end of a crank shaft 44 journalled in the bearing 45 secured to the face of the plate 1 immediately above the solenoid 42. The crank shaft extends inwardly toward and parallel to the film and carries at its inner end an eccentric cam member 46 which engages a plunger 47 located in the path of the right-hand edge (Fig. 5) of the positive film P. The plunger 47 is in the nature of a punch which cooperates with a fixed punch plate 48 projecting laterally between the edges of the negative and positive films. As a preferable construction, the plunger 47 is surrounded by a casing 49 and within the casing is a coil spring 50 which engages a pin 47ª of the plunger thereby acting to yieldingly force the same in contact with the eccentric cam 46. By means of this mechanism the plunger 47 is capable of being pushed forwardly by the rotation of the eccentric cam 46 when the armature of the solenoid is actuated by the energizing of the coil thereof, the forward movement of the plunger acting to punch a semi-circular shape notch P in the edge of the positive film (Fig. 6) which serves to indicate the point at which the positive film is to be cut. As a means for energizing the solenoid at the proper instant, a separate circuit is utilized, consisting of conductors 51, 51 (Fig. 7) connecting the positive and negative sides of the main circuit M with the corresponding terminals of the solenoid 42. In series with one of the conductors 51 is a switch 52, shown in Fig. 1 as located vertically below the switch 36 forming a part of the light controlling apparatus and immediately below the guide members 2 and on the opposite side of the path of the films from the plunger 47. This switch 52 comprises a lever 53 fulcrumed at 54 intermediate its ends, the lower end being connected with a T-shaped rod 55 mounted to slide endwise and at right angles to the path of the films. At the ends of the cross arm of the rod 55 are mounted grooved rollers 56, 56 adapted to engage the edge of the negative film N and spaced apart a distance slightly greater than the length of the notches $n$ utilized for operating the switch associated with the light changing apparatus. At the upper end of the switch lever 53 is provided a contact point $53^a$ adapted to engage a fixed contact point $57^a$ mounted upon a plate 57, said points being normally out of contact with each other. A small coil spring 58 is connected with the lever 53 in such a way as to force the rollers 56, 56 into contact with the edge of the negative film N. To operate the switch to close the circuit and to thereby operate the plunger 47 to punch the notches P in the positive film, a notch N' (Fig. 6) is cut in the margin of the film at points spaced apart a predetermined distance, as for instance, two hundred feet. The notches $n'$ are cut in the same edge of the film N as the notches $n$ and in the same manner, the distinction being only in the length, the notches $n'$ being substantially twice the length of the notches $n$. The purpose of forming the notches $n'$ of greater length than the notches $n$ is to provide an arrangement such that both switches will not be operated by either form of notch. In other words, the shorter notches $n$ as well as the longer notches $n'$ will operate the upper switch 36 whereas only the longer notches $n'$ will operate the lower switch 52, this being due to the fact that the latter includes the two rollers 56, 56 which will not permit the switch to function unless both of said rollers engage a notch long enough to receive the same simultaneously. For this reason the shorter notches $n$ will pass the rollers 56, 56 without operating the punch operating circuit switch. While it is true that the light controlling switch 36 will be closed when the roller 38 thereof engages the longer notches $n'$, it is quite proper that this be so for the reason that it is possible, as well as convenient, to cut the film at the point where there is a change of scene so that when the film is to be severed a point is selected at which a scene change occurs, in which case a long notch $n'$ is cut in the film which operates both switches, thus effecting a change in light intensity as well as marking the positive film for severing. Inasmuch as light changes are considerably more frequent than the intervals at which the film is to be cut, this procedure is not objectionable.

A light controlling mechanism such as herein described is entirely automatic in its action and, operating in conjunction with a previously prepared tabulating strip, provides a dependable means for changing the light intensity. The various settings to obtain the desired degrees of light intensity may be readily verified by comparing the numerical indications on the contact strips with those indicated on the tabulating strip by merely glancing down the parallel column of figures. Furthermore, subsequent changes in the degrees of light intensity can be readily made by altering the figures on the tabulating strip and shifting the corresponding indicator strip accordingly. A further advantage resides in the fact that the device is exceedingly flexible in that any number of conductor bars 7 may be used, the only limitation being the height of the panel on which they are mounted. In this way films of almost any length may be printed in a single operation without a resetting of the device or a replacement of the tabulating strips T.

Although I have shown a preferable construction for an apparatus embodying the features of the invention, it is to be understood that various modifications may be employed without departing from the spirit of the invention. For instance, a bank of lights may be used instead of a single lamp circuit and a rheostat. For this reason, therefore, I do not wish to be limited except in so far as the invention is specifically set forth in the appended claims.

I claim:

1. In a printing apparatus for motion picture films, the combination of a lamp and lamp circuit, means for varying the light intensity of said lamp comprising a series of selective resistances and contact bars connected therewith, a series of conductors having slidable contact members adapted to contact with said selective contact bars and provided with indications of light intensity, a tabulating strip bearing light intensity and film subject indications, a film controlled switch member in said lamp circuit provided with an indicator registering with the indications on said strip.

2. In a printing apparatus for motion picture films, the combination of a lamp and lamp circuit, and means for changing the intensity of the light at predetermined intervals in printing operation comprising a rheostat, a series of selective contact members connected with said rheostat, a series of conductor bars corresponding to the number of light intensity changes required during the printing of the film, sliding contact members mounted on said conductor bars and bearing indications of light intensity, a tabulating strip on which the sequence of light intensity changes are tabulated, and adapted for mounting transversely of said conductor bars whereby said contact members are set with corresponding indications in registering relation.

3. In a printing apparatus for motion picture films, the combination of a lamp and lamp circuit, a panel board associated with said printing apparatus, a series of selective resistances and corresponding contact bars mounted on said board, a series of conductor bars, a contact member slidably mounted on each conductor bar and having light intensity indications thereon, said members being adapted to be set in contact with a predetermined contact bar, a tabulating strip adapted to be attached to said board and having light intensity indications thereon, said contact members being set to correspond with registering light indications, a movable switch member adapted to contact successively with said conductor bars actuated by the movement of the film and means for visually indicating on said strip the relative position of said switch member and the portion of film being printed.

4. In a film printing machine, the combination with a lamp and lamp circuit, of a board comprising a plurality of contact bars, a rheostat, a plurality of conductor bars, a film controlled switch member in said lamp circuit and actuated to successively close the circuit through said conductor bars, adjustable contact members mounted on said conductor bars and provided with a series of light intensity indications thereon, a film tabulating strip having corresponding light intensity indications, said contact members being manually set to register with the corresponding indications on said strip, and an indicator on said switch member adapted to register with said indications of the tabulating strip.

5. In a printing apparatus for motion picture films, the combination of a lamp and lamp circuit, a panel board, a rheostat mounted on said board, a series of contact bars connected with said rheostat, conductor bars mounted on said board and provided with endwise sliding contact members adapted for selective contact with said contact bars, means for visually indicating the setting of said contact members, a switch member in the lamp circuit adapted for successive contact with said conductor bars, an endless chain carrying said switch member, pawl and ratchet mechanism operatively connected with said chain, and a solenoid connected with said pawl, and a circuit including said solenoid and a switch mounted adjacent the path of said film and operative thereby to close said solenoid circuit at predetermined intervals in printing operation.

6. In a printing apparatus for motion picture films, the combination of a lamp and lamp circuit, a panel board, a rheostat, a series of contact bars connected with said rheostat, conductor bars mounted on said board and provided with endwise sliding contact members adapted for selective contact with said contact bars, means for setting said contact members in sequence to correspond with the change of light intensity required in printing, a switch member in the lamp circuit adapted for successive contact with said conductor bars, a sprocket chain carrying said switch member, pawl and ratchet mechanism operatively connected with said sprocket chain, and an independent circuit including a solenoid and controlled by said film for advancing said switch member.

In witness whereof, I hereunto subscribe my name this 5th day of May, A. D., 1921.

OSCAR B. DEPUE.